March 24, 1931. L. HOCKSTEIN 1,797,915
VENTILATOR
Filed April 27, 1929
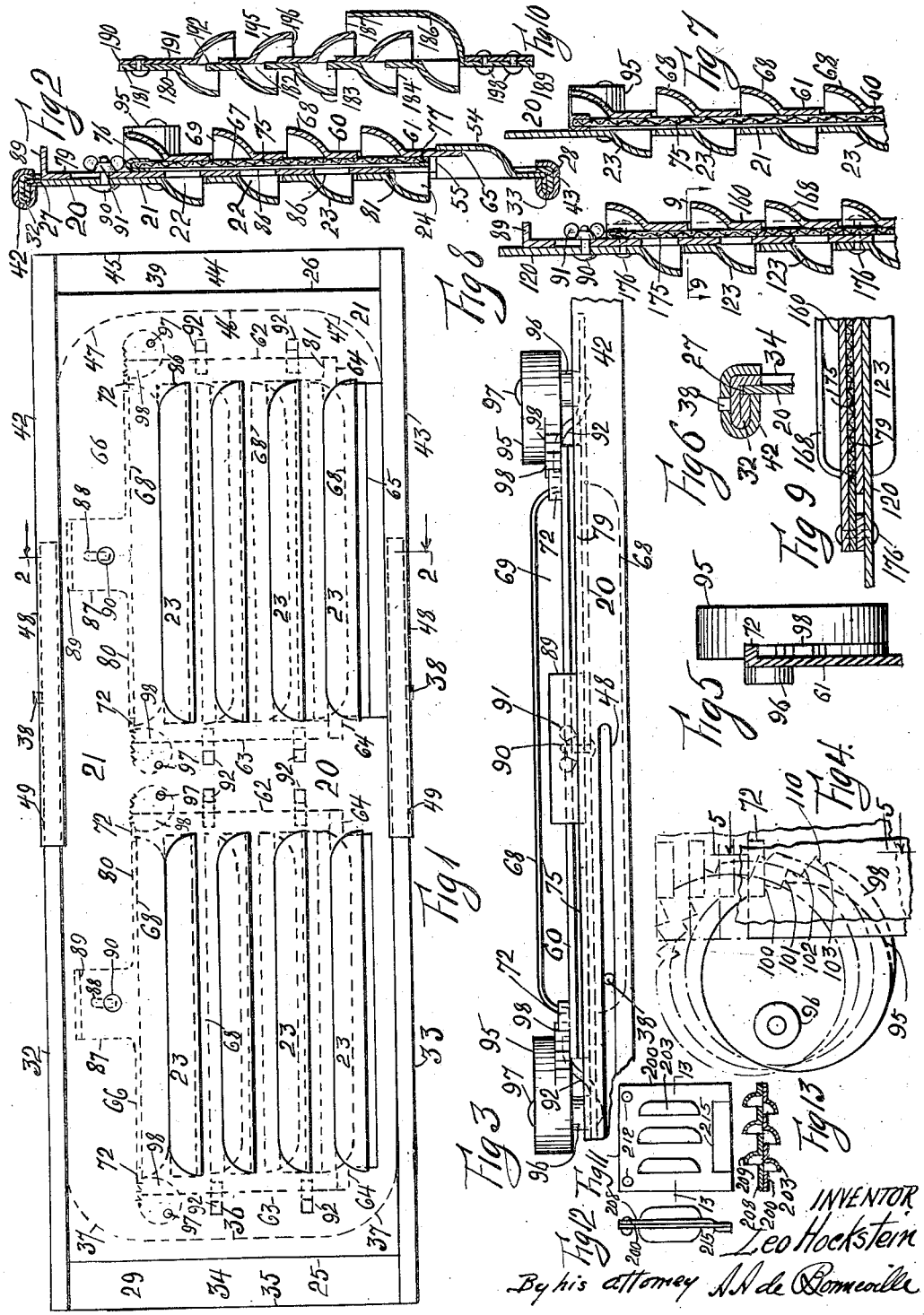
INVENTOR
Leo Hockstein
By his attorney Patented Mar. 24, 1931

1,797,915

UNITED STATES PATENT OFFICE

LEO HOCKSTEIN, OF JERSEY CITY, NEW JERSEY

VENTILATOR

Application filed April 27, 1929. Serial No. 358,541.

This invention relates to an improved ventilator.

The object of the invention is the production of a ventilator in which the air passages for ventilation therethrough can be adjusted to vary their areas. The second object of the invention is the production of a ventilator which prevents rain, snow, drafts, insects and the like from passing therethrough. The third object of the invention is the production of a ventilator which can be adjusted to adapt it to openings of different sizes. The fourth object of the invention is the production of a ventilator adapted to be used for windows of buildings and the like, as well as for automobiles, busses and other vehicles. The fifth object of the invention is the production of a ventilator that can be made of various materials such as sheet metal, glass, porcelain, bakelite and the like. The sixth object of the invention is the production of a ventilator in which the wire mesh thereof is protected from injury.

In the accompanying drawings Fig. 1 represents an outside elevation of an exemplification of the improved ventilator; Fig. 2 shows an enlarged section of Fig. 1 on the line 2, 2; Fig. 3 indicates an enlarged top plan view of a portion of Fig. 1; Fig. 4 is an enlarged fragmentary portion of Fig. 1 with its movable elements in different positions; Fig. 5 represents a partial section of Fig. 4 on the line 5, 5; Fig. 6 indicates an enlarged fragmentary portion of the upper portion of Fig. 2; Fig. 7 represents a section similar to Fig. 2 with a modification; Fig. 8 is a section similar to Fig. 2 with a second modification; Fig. 9 indicates an enlarged section of Fig. 8 on the line 9, 9; Fig. 10 represents a section of a third modification of the ventilator; Fig. 11 indicates an elevation of a fourth modification of the ventilator; Fig. 12 shows a side view of Fig. 11 and Fig. 13 is a section of Fig. 11 on the line 13, 13.

In this exemplification of the ventilator and referring to Figs. 1 to 6 inclusive, the ventilator is indicated to essentially comprise the outside member designated in its entirety by the numeral 20, the inside movable members designated each in its entirety by the numeral 60, and the movable shutter designated in its entirety by the numeral 79.

The member 20 is shown with the flat body-portion 21, having the longitudinal openings 22, spaced one over the other. The said openings are covered by the downwardly extending hoods 23, each having the opening 24 at its lower end. The ends of the body portion 21 are indicated at 25 and 26, and the top and bottom edges of the said body portion 21 are indicated at 27 and 28.

A slidable end member 29 is provided for the member 20, which coacts with the end 25 thereof. The said slidable end member 29 comprises the similar arms 32 and 33, which respectively engage the member 20 at its top and bottom edges 27 and 28. A plate 34 having the outer straight edge 35, the inner edge 36 with the curved end portion 37 extends between the arms 32 and 33. Locking pins 38 extend from the arms 32 and 33.

A second slidable end member 39 is provided for the member 20 and coacts with its end 26. The slidable member 39 comprises the similar U-shaped arms 42 and 43 that engage the arms 32 and 33. A plate 44 similar to 34 extends between the arms 42 and 43. The plate 44 is shown with the outer straight edge 45, and the inner edge 46 with the curved end portions 47. Locking grooves 48 are formed in the heads 42 and 43 and engage the locking pins 38. The grooves 48 do not quite extend to the ends of the arms 42 and 43 as indicated at 49.

With the body portion 21 of the member 20 and at the lower portion thereof is formed the upwardly extending hood 54 with the opening 55 at its top end. The hood 54 is reversed in position to the hoods 23.

The inside movable members 60 are indicated each with the flat body portion 61. The said body portions 61 each have the side edges 62, 63 with the shoulders 64, the bottom edge 65 and the top edge 66. The bottom edge 65 enters the hood 54. Each flat body portion 61 is shown with the openings 67. Each of the latter openings is covered with the upwardly extending hood 68 having the top opening 69. It will be noted that the hoods 68 are oppositely positioned to the hoods 23. A pair of locking lugs 72 extend from each body portion 61 at its top edge 66. A screen 75 preferably of wire mesh and having a rim 76 at its edges is fastened to the inside face of each body portion 61, by means of spot welding or other suitable means. The screens 75 cover the openings 67 of each of the members 60. The edges of each rim 76 are in line with the edges of its body portion 61, except at its bottom edge 77 which is spaced from the edge 65.

Between each screen 75 and the outside member 20 is slidably located the shutter 79, having the top edge 80 and the bottom edge 81. Openings 86 are formed in each shutter. A lug 87 having the elongated opening 88 extends from each shutter and an adjusting flange 89 extends from the top end of each of said lugs. A clamping bolt 90 with the wing nut 91 extends through openings in the member 20 and the openings 88 to clamp the shutter in different positions.

The inside member 60 with its screen 75 and the shutter 79 are maintained in slidable relation to the outside member 20, by means of lugs 92 that extend from the latter.

Locking wheels are each indicated with the cylindrical body portion 95 having the hub 96. The said wheels are eccentrically journaled to the body portion 21 of the member 20, by means of journal pins 97. Each of said wheels has extending therefrom a flange 98, having locking teeth with locking faces 100, 101, 102 and 103. The said locking faces are adapted to lock with the locking lugs 72. Each locking face has formed therewith at right angles thereto an abutting face 110. It will be noted that the perimeter of the flange 98 is eccentric to the longitudinal axis of the journal pin 97.

Referring to Fig. 7 it will be noted that the ventilator is indicated without the shutter. The outside member 20 is constructed as already described and is indicated with its flat body portion 21 and the hoods 23. The inside movable member 60 is indicated with its flat body portion 61, the hoods 68, the screen 75, the locking wheel having the body portion 95 and its appurtenances.

Referring to Figs. 8 and 9, the locking wheel having the body portion 95 is omitted, and the outside and inside members of the ventilator are stationary relatively to each other. The outside member indicated at 120, is similar to 20. It is shown with the hoods 123 similar to 23. The inside member is indicated at 160, similar to 60, and has formed therewith the hoods 168 similar to 68. A screen 175 similar to 75 is provided for the member 160. The members 120 and 160 are connected by rivets 176. Between the screen 175 and the member 120 is slidably located the shutter 79 as already described. The shutter is shown with its clamping bolt 90 and wing nut 91 as already described.

Referring to Fig. 10 a pair of stationary members are indicated devoid of any screen and shutter. In this instance the outside member 180 of the ventilator is indicated with the flat body portion 181, having the openings 182. Downwardly extending hoods 183 with the bottom openings 184 extend from the body portion 181 and are over openings 182. At the lower end of the body portion 181 is fastened the upwardly extending hood 186 with the opening 187 at its top end. The hood 186 has extending therefrom the leg 189 which extends through an opening in the body portion 181, and is fastened to the latter. The inside member of the ventilator is indicated at 190 having the flat body portion 191 with the openings 192. Downwardly extending hoods 195 with the openings 196 at their lower ends extend from the body portion 191. The members of the screen are connected by the rivets 198. The lower ends, in this instance, of the two lower most hoods 192, extend within the hood 186, so that all water, dust and the like which may collect in the screen gravitates into said hood 186, from which it escapes by gravity.

Referring to Figs. 11, 12 and 13, the ventilator is indicated with its hoods in a vertical position adapted for the hood of an automobile engine and the like. In this instance the ventilator is shown to comprise the outer member 200, having the hoods 203 and the inner member 208 with the hoods 209. The members may be connected to each other at their top ends by the rivets 212 and the lower end of the inner member extends through the outer member as indicated at 215.

To use the ventilator, and referring to Figs. 1 to 6 inclusive, the operator locates the inside movable member 60, in its desired position to secure small or large openings through the ventilator, by engaging the locking lugs 72 with any of the locking faces 100 to 103 of the flanges 98 of the locking wheels having the body portions 95. It will be noted that the locking wheels 95 are eccentrically journaled to the member 20, and that the locking lugs 72 of the members 60 can bear on any of the faces 100 to 103, and that said lugs 72 also bear against the abutting faces 110, and thereby the inside members 60 are maintained in locked position at various levels. In Figs. 1 and 2 the locking lugs 72 engage the locking faces 100 and thereby the openings 22 and 67 are somewhat open to each other, although the said openings may be located to be completely closed in this position of the members as indicated in Fig. 7. A second means to control the amount of the ventilating passages between the members 20 and 60 is obtained by locating the shutter 79 in different positions, by means of the lugs 87 and the clamping bolts 90. Thereby the openings 86 in the shutter are located to either completely or partly close the openings 22 or 67. To change the level of the members 60, the lugs 72 are disengaged from the locking faces of the wheels having the body portions 95, and locked with the locking face to give it the required level.

Referring to Fig. 7 the shutter 79 is omitted and the openings between the members 20 and 60 are easily controlled by means of the locking wheels having the body portions 95 and their coacting appurtenances.

In Figs. 8 and 9 the members 20 and 60 are fastened to each other and the openings between the hoods of the said members are located for normal conditions and ventilation. If desired, the passages for ventilation between the members 20 and 60 can be varied by locating the shutter 79 in different positions, by means of the clamping bolt 90.

It will be noted that the hoods 68 of the inside member 60 functions as traps for water, rain, snow, insects, &c. that may be blown into the ventilator, and said foreign matters are discharged from the ventilator by way of the hood 54 by gravitation.

Various modifications may be made in the invention and the present exemplification is to be taken as illustrative and not limitative thereof.

Having described my invention what I desire to secure by Letters Patent and claim is:

1. In a ventilator the combination of an outside member having openings, a forwardly and downwardly extending hood spaced from and over each of said openings, an inwardly and upwardly extending hood extending from the lower end of said outside member, an inside member slidably connected to the outside member, the inside member having openings therein, and an inwardly and upwardly extending hood spaced from and over each of the latter openings, the lower end of the inside member disposed to enter the upwardly extending hood of the outside member.

2. In a ventilator the combination of a member having ventilating openings, a second member having ventilating openings slidably connected to the first member, locking lugs extending from one of said members, locking wheels journaled to the other member having locking faces extending therefrom adapted to support said locking lugs at different levels.

3. In a ventilator the combination of an outside member having ventilating openings, an inside member having ventilating openings slidably connected to the outside member, locking lugs extending from the inside member, locking wheels eccentrically journaled to the outside member, each locking wheel having locking faces and abutting faces formed therewith to support said locking lugs at different levels.

4. In a ventilator the combination of an outside member having openings, a hood spaced from and over each of said openings, an upwardly extending hood at the lower end of said outside member, an inside member to the rear of said outside member, said inside member having openings therein co-acting with the openings of the outside member, and a hood spaced from and over each of the openings of the inside member, the lower end of the inside member, adapted to enter the upwardly extending hood at the lower end of said outside member.

5. In a ventilator the combination of an outside member having openings, a hood spaced from and over each of said openings, an upwardly extending hood extending from the lower end of said outside member, an inside member to the rear of said outside member, said inside member having openings therein co-acting with the openings of the outside member, a hood spaced from and over each of the openings of the inside member, the lower end of the inside member extending into the upwardly extending hood at the lower end of said outside member, and a screen covering the openings in one of the members.

6. In a ventilator the combination of an outside member having openings, a hood spaced from and over each of said openings, an upwardly extending hood extending from the lower end of said outside member, an inside member slidably connected to the outside member, the inside member having openings therein co-acting with the openings of the outside member, the lower end of the inside member extending into the upwardly extending hood at the lower end of the outside member, a hood spaced from and over each opening of the inside member, a screen covering the openings of the inside member, means to detachably support the inside member at different levels, a shutter having openings co-acting with the openings of the members slidably positioned between the members, and means to clamp the shutter at different levels.

Signed at the borough of Manhattan, city of New York in the county of New York and State of New York this 22nd day of April, A. D. 1929.

LEO HOCKSTEIN.